No. 36,167.

M. RAE.
LAMP.

PATENTED AUG. 12, 1862.

Witnesses:
J. W. Coombs
G. W. Reed

Inventor:
Martin Rae
her attorneys

UNITED STATES PATENT OFFICE

MARTIN RAE, OF MANCHESTER, COUNTY OF LANCASTER, ENGLAND.

IMPROVEMENT IN LAMPS.

Specification forming part of Letters Patent No. 36,167, dated August 12, 1862.

*To all whom it may concern:*

Be it known that I, MARTIN RAE, of the city of Manchester, in the county of Lancaster and Kingdom of Great Britain, have invented a new and useful Improvement in Lamps; and I do hereby declare that the following is a full, clear, and exact description of the same, reference being had to the accompanying drawings, making a part of this specification, in which—

Figure 1:
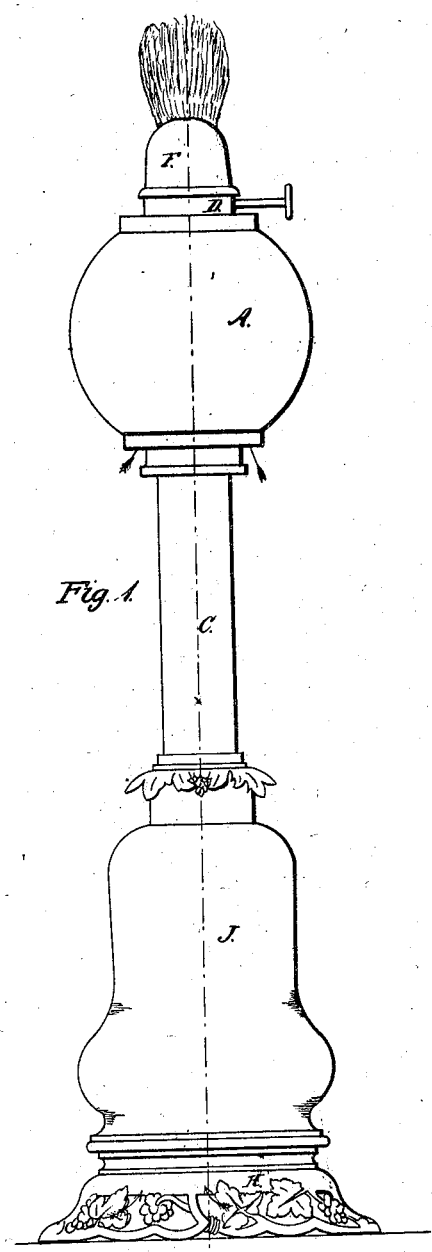
Figure 2:
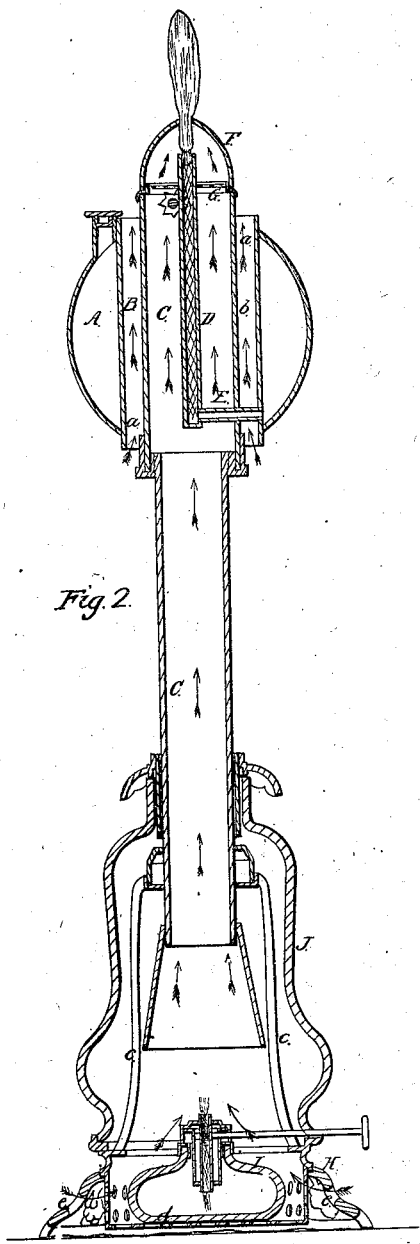

Figure 1 is an external view of my invention; Fig. 2, a vertical central section of the same, taken in the line $x\ x$, Fig. 1.

Similar letters of reference indicate corresponding parts in the two figures.

My invention consists in causing a current of air to impinge against the flame of a lamp by means of a lamp, taper, light, or other heat-producing agent placed within or under a tube or tubes communicating with the burner, which, on being lighted or heated, causes an upward current of air that, coming in contact with the flame of the lamp, produces a white light.

To enable those skilled in the art to fully understand and construct my invention, I will proceed to describe it.

A represents the fountain of the lamp, which may be made of glass, metal, or other suitable material. This fountain has a tube, B, passing through it, and open at both ends, in which the upper part of a tube, C, is fitted, the fountain being secured to the tube C by arms $a$. The tube C is considerably smaller in diameter than the tube B, to allow a space, $b$, of requisite width between them, as shown clearly in Fig. 2.

D is the wick-tube, which is placed centrally within the upper part of the tube C, and communicates at its lower end with the fountain A by a tube, E. The upper end of the tube C is provided with a cone or deflector, F, and the top of the tube C is covered by a piece of wire gauze or cloth, G. The tube C extends down below the fountain A, and it is connected by rods $c\ c$ to the base H of the lamp, in which base a small lamp, I, is fitted. The base H has a perforated bottom, $d$, and also perforated sides $e$, through which air passes to feed the flame of lamp I, and also to feed the flame of the wick-tube D, which is the illuminating-flame.

On the base H there is placed a shell or case, J, which extends some distance upward on the tube C and forms a chamber above the base H. The tube C extends a trifle above the fountain A, so that the latter will not cast a shadow at any considerable distance from the base H.

The operation will be readily understood. The lamp I, when lighted, rarefies the air in tube C and induces a draft therein, (see black arrows,) which impinges against the flame of the wick-tube D and supplies it with a requisite amount of oxygen to support proper combustion, causing the illuminating-flame to burn with a white light and without the emission of smoke, or any unpleasant odor. A glass chimney may be used or not, as desired.

The lamp constructed as described is applicable for burning what is commonly termed "light oils," and the space $b$ between the tubes B C admits of a current of air passing up, as indicated by the blue arrows, to keep the oil in a cool state, or sufficiently so to prevent undue volatilization. For heavy oils, the fountain A is not provided with the tube B, the tube C being in direct contact with the fountain, in order to cause the oil to be volatilized sufficiently to keep the flame of the wick-tube D properly supplied with vapor. The lamp I may be supplied with any suitable burning material. A taper may be used instead, or any heat-producing agent.

I do not confine myself to the form of the parts herein described, nor to the precise arrangement of the same, for these may be varied and modified in various ways and the same end attained.

I do not claim the exclusive use of any of the parts of the lamp herein described when separately considered; but,

Having thus described my invention, what I do claim as new, and desire to secure by Letters Patent, is—

The employment or use of a lighted lamp, taper, or other heat-producing agent at the bottom of or into the air-tube or air-tubes of the lamp, arranged to operate in the manner as and for the purpose herein set forth.

MARTIN RAE.

Witnesses:
  H. B. BARLOW,
    *Manchester, Patent Agent.*
  H. B. BARLOW, Jr.,
    *Manchester, Draughtsman.*